United States Patent [19]

Brown, Jr.

[11] 3,899,794

[45] Aug. 12, 1975

[54] FRONT LOADING DISC DRIVE APPARATUS

[75] Inventor: Leon Henry Brown, Jr., Sylmar, Calif.

[73] Assignee: Wangco Incorporated, Los Angeles, Calif.

[22] Filed: Nov. 30, 1973

[21] Appl. No.: 420,664

[52] U.S. Cl. .................... 360/133; 360/86; 360/97

[51] Int. Cl. .................... G11b 23/04; G11b 17/22

[58] Field of Search .......... 360/133, 97, 98, 99, 86, 360/135; 346/137; 206/62 P

[56] References Cited

UNITED STATES PATENTS

| | | | |
|---|---|---|---|
| 3,416,150 | 12/1968 | Lindberg, Jr. | 360/97 |
| 3,487,390 | 12/1969 | Klinger et al. | 360/98 |
| 3,662,360 | 5/1972 | Lambert | 360/97 |
| 3,800,325 | 3/1974 | O'Brien | 360/133 |

*Primary Examiner*—Alfred H. Eddleman
*Attorney, Agent, or Firm*—Henry M. Bissell

[57] ABSTRACT

Apparatus for receiving and driving magnetic disc cartridges as peripheral computer memory units. Particular mechanisms are included which render the apparatus more effective and more compact than previously known corresponding devices of a comparable nature. These mechanisms cooperate to provide means for inserting the disc cartridge in a horizontal attitude, permitting the apparatus to be completely contained within a reduced vertical dimension and thus saving substantial space. These mechanisms are operatively coupled to the loading door so that, as the loading door is rotated through approximately 60° to its open position, a pair of actuators coupled thereto are rotated through approximately 90° to first lift and then translate the disc cartridge receiver forward to its fully extended position. During this motion, various door opener levers which are associated with the receiver for the purpose of opening the head entry door of the disc cartridge to the extent necessary to permit entry of the heads therein when the cartridge and receiver are in the retracted position for operation within the disc drive apparatus are withdrawn so that the head entry door may be closed when the cartridge is withdrawn from the receiver. When the cartridge is inserted within the receiver, the head entry door is opened to a first extent by a pivoted bail member and the reverse of the above-described operations occurs as the loading door is closed so as to retract the receiver with the disc cartridge therein to the operating position.

18 Claims, 6 Drawing Figures

PATENTED AUG 12 1975 3,899,794

SHEET 1

FRONT LOADING DISC DRIVE APPARATUS

BACKGROUND OF THE INVENTION

1. Field of the Invention

This invention relates to apparatus for driving disc memory devices, and more particularly, to apparatus for driving magnetic cartridges of a particular type for use as peripheral computer data storage.

2. Description of the Prior Art

The particular type of disc cartridge for which the apparatus embodying the present invention is designed is the IBM 2315 type. This cartridge is designed for loading into the apparatus from the front through a front door or panel which may be pivoted open for loading or removal of the cartridge. Various vendors other than IBM manufacture and sell disc drive apparatus for use with this type of cartridge. The cartridge is a standard size and shape, and certain of the components within the disc drive apparatus are standard or at least present certain minimum dimensions insofar as their size and spatial relationship to the cartridge inserted in the disc drive apparatus is concerned. Thus, there are certain minimum dimensions for the disc drive apparatus which are more or less standard throughout the industry. However, rack space is at a premium in equipment mounting one or more disc drive units and, where a particular design can be achieved which significantly reduces the rack space required for a disc drive apparatus, an important benefit may be achieved.

Those front loading disc drive apparatus which are known are provided for rack mounting in a vertical space of 8¾ inches. Since mounting racks are customarily designed for variations of vertical spacing in minimum increments of 1¾]inches, it is necessary to reduce the vertical height of the disc drive apparatus to 7 inches before any real saving of space is realized. Previously known disc drive apparatus of the front loading type provides for the insertion of the disc cartridge through the open front panel door of the apparatus at an angle tilted downward at the rear so that the cartridge may clear the upstanding drive spindle which extends vertically from the base within and near the center of the apparatus. Having to insert and remove the disc cartridge at an angle in this fashion necessarily requires additional vertical space for the apparatus, which space is not needed except during the loading and unloading steps. If loading could be accomplished with the cartridge in the less inclined attitude, less vertical space would be required for the disc drive apparatus. However, so far as is known, until the introduction of the present invention no one else has been able to provide the particular mechanisms which are capable of accomplishing such purpose.

SUMMARY OF THE INVENTION

In brief, the present invention comprises particular disc drive apparatus incorporating various mechanisms interconnected to cooperate in the manner which permits loading and unloading of the disc cartridge in a horizontal attitude. These mechanisms serve to move the disc cartridge between an extended position for insertion or withdrawal of the cartridge and a retracted position in which the cartridge is properly located and mounted for operative utilization simply in response to the opening or closing of the front panel loading door. In addition, these mechanisms include means for preparing the cartridge for operative use during loading and for transport and storage during unloading.

The standard IBM 2315 type cartridge is provided on its underside with an air door and a pair of cartridge locater recesses, plus the mechanism for mating with the drive spindle of the disc drive in which it is to be placed. The air door is conventionally opened by an air door actuator mounted in the disc drive apparatus so that clean, filtered air may be driven through the cartridge to sweep the discs and read/write heads during operation. The door is closed when the cartridge is removed so as to protect the internal mechanism of the cartridge during storage and transport. Locator pins mounted within the disc drive for locating the aforementioned recesses on the underside of the cartridge so as to properly position the cartridge disc on the drive spindle are also standard. The cartridge also includes a head entry door on its upper side which must be opened to a proper extent when ready for use in order to admit the read/write heads of the disc drive during operation. Opening this head entry door to the necessary extent without exceeding the maximum head spaced allowable in the present apparatus is accomplished in accordance with an aspect of the invention by the provision of dual head entry door lift mechanisms that operate in combination as the cartridge is loaded into operative position within the disc drive apparatus.

In addition, the standard disc cartridge is provided with an interior sealing ring which, when the cartridge is removed for storage or transport, contacts and bears against the internal disc so as to protect it from external dust and contamination and from undesired movement or rotation within the cartridge. Disc drive apparatus in accordance with the present invention provides spacers to raise the disc cartridge housing by a predetermined amount relative to the internal disc as the disc is pulled down and held by a magnetic retention mechanism for driving in operative position on the drive spindle, thus clearing the internal sealing ring so that the disc is freed from retention thereby.

When the disc cartridge is to be unloaded from the disc drive apparatus, it is necessary to break the magnetic force of the permanent magnetic retention mechanism. This force customarily amounts to about 35 pounds. The unloading mechanism in the present invention advantageously achieves this breakaway of the disc from the retention mechanism by initially lifting the front of the disc cartridge so that the magnetic retention force is broken. Thereafter, the rear of the cartridge is lifted to a corresponding level and the entire cartridge is translated forward in its receiver to the extended position where the cartridge may be removed. The extension of the cartridge in its receiver to the position where it can be removed by the operator is accomplished automatically as the loading door is being opened by the operator. In accordance with an aspect of the invention, a solenoid-operated latching mechanism is provided for preventing the opening of the loading door during certain conditions of the apparatus, such as if the power is removed or if the disc is rotating.

BRIEF DESCRIPTION OF THE DRAWING

A better understanding of the present invention may be had from a consideration of the following detailed description, taken in conjunction with the accompanying drawing, in which.

DESCRIPTION OF THE PREFERRED EMBODIMENT

Figures 1, 2:
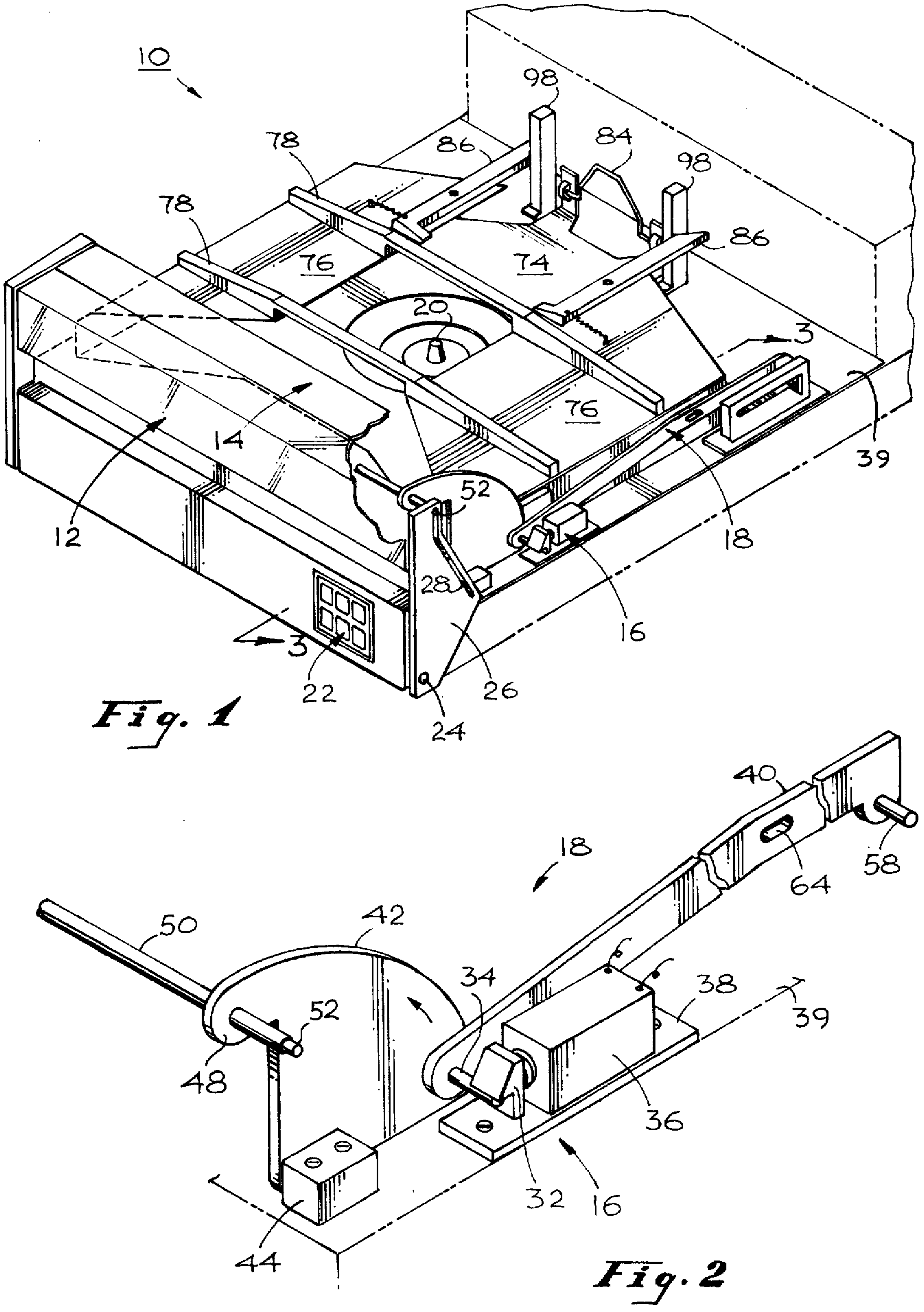
FIG. 1 is a front quarter isometric view of particular disc drive apparatus in accordance with the present invention.
FIG. 2 is an isometric view showing the latching mechanism of the apparatus of FIG. 1.

Referring now to the drawing, in particular FIG. 1, there is shown a particular disc drive apparatus 10 of the front loading type in accordance with the present invention. As shown in FIG. 1, the apparatus 10 includes a front panel loading door 12, a disc cartridge receiver 14, a door latch mechanism 16, and a receiver retracting mechanism 18. Also shown is a drive spindle and magnetic holddown member 20 and the front control panel 22.

The front panel loading door 12 pivots through approximately 60° about a transverse axis through the point 24 at the lower front corner thereof. The loading door 12 is provided with a bracket 26 on each side containing the mounting for the pivot point 24 and also containing a guide slot 28 for controlling the receiver actuating mechanism 18 as the door 12 is moved between opened and closed positions.

Referring to FIG. 2, particulars of the door latching mechanism 16 and portions of the receiver actuating mechanism 18 are shown therein. The latching mechanism 16 comprises a spring loaded, retractable catch 32, a rod 34 engagable by the catch 32, and a solenoid 36 which, when energized, acts to retract the catch 32 to release the rod 34. Catch 32 and solenoid 36 are mounted on a base 38 which is attached to the frame 39 of the apparatus 10 by suitable mounting means, such as screws. The electrical wires to the solenoid 36 are omitted for simplicity.

Portions of the receiver actuator mechanism 18 shown in FIG. 2 include a rear lifter lever 40, a receiver actuator plate 42 with associated pivot member 44. The pin 34 is also part of the mechanism 18 and extends through the plate 42 to secure the forward end of the lever 40 thereto by a pivotable mounting. The actuator plate 42 is configured to provide a forwardly extending ear 48 through which is affixed a rod 50 having at each end thereof a pin 52 which extends through and is guided by the guide slot 28 of the end bracket 26 (FIG. 1). The pivot member 44 is mounted to the frame of the apparatus 10 by suitable mounting members such as screws. A receiver actuating mechanism 18 is provided on each side of the apparatus 10 for operation in unison to control the extension and retraction of the receiver 14. However, only a single latching mechanism 16 is provided on the right-hand side of the apparatus 10.

Figure 3:
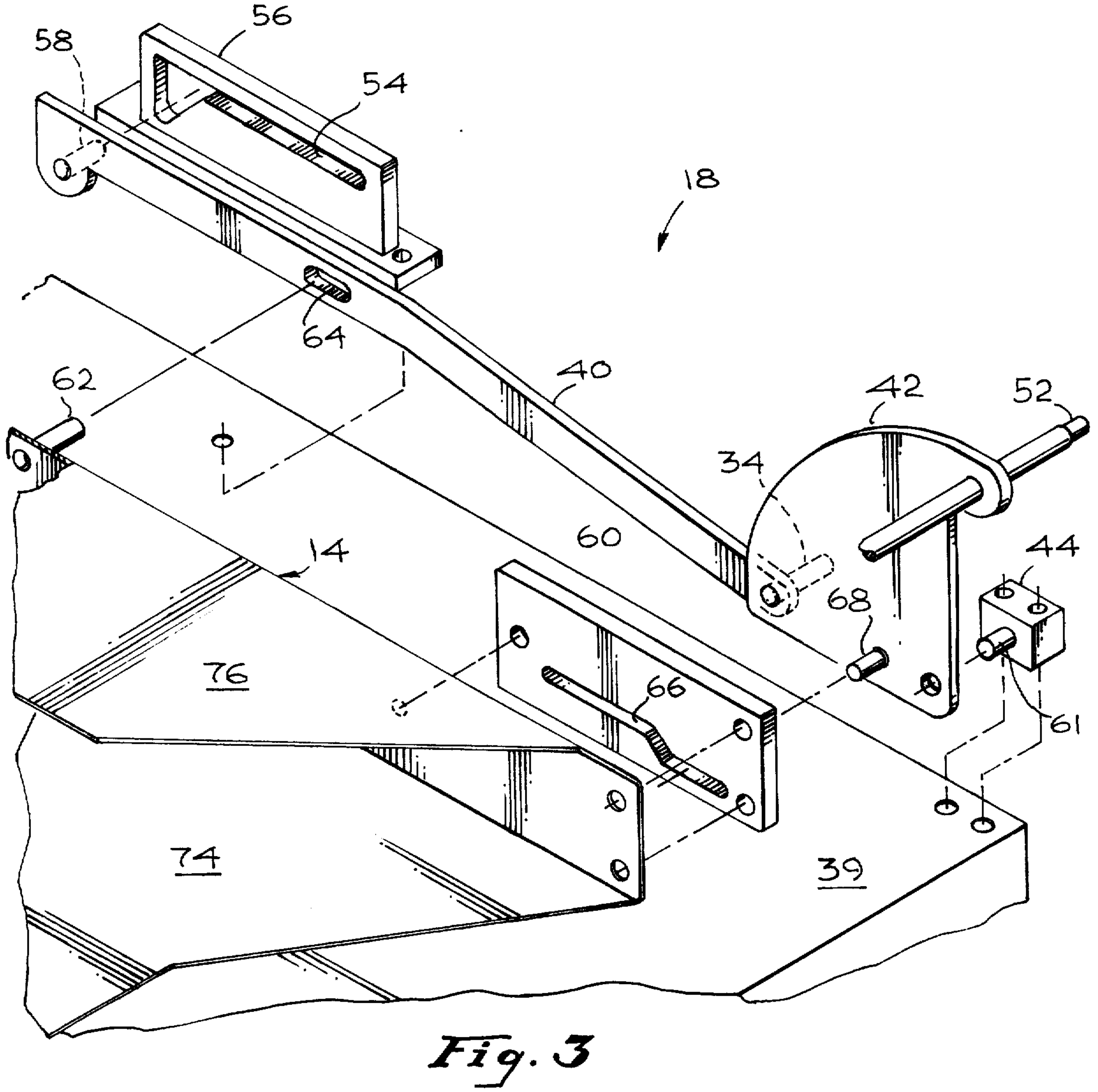
FIG. 3 is an exploded view of the retracting mechanism of the apparatus of FIG. 1, looking in the direction of the arrows 3–3 thereof, which mechanism is shown in the retracted position with the loading door closed.
Figure 4:
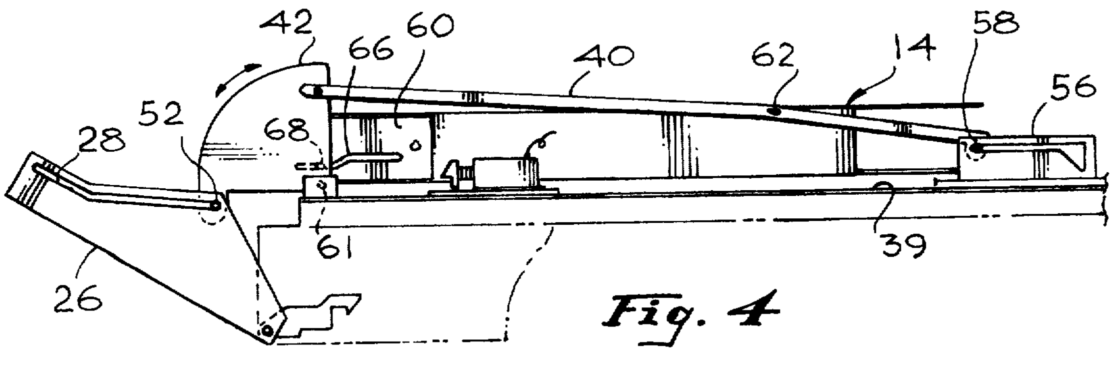
FIG. 4 is a schematic elevational view of the mechanism of FIG. 3, except that the mechanism is shown in the extended position with the loading door open.

The further elements comprising the receiver actuator mechanism 18 and the operation thereof may best be described by reference to FIGS. 3 and 4 which are views showing two different positions of this particular portion of the apparatus 10. FIG. 3 shows the various components of the mechanism 18 in an attitude with the loading door 12 closed and the receiver 14 retracted, while FIG. 4 shows the same elements in an attitude with the loading door 12 open and the receiver 14 extended. As mentioned, the lever 40 is pivotally connected at its forward end to the actuator plate 42 by means of the pin 34. The rearward end of the lever 40 is constrained for movement within a slot 54 of a lever guide 56 by means of a pin 58 extending into the slot 54. The lever guide 56 is fixedly mounted in position on the base or frame 39 by suitable mounting means such as screws. The actuator plate 42 is pivotably mounted at its lower forward corner about a pivot pin 60 of the pivot member 44. The receiver 14 is coupled to the actuator mechanism 18 its forward end via a receiver guide 60, affixed to the receiver 14 by screws or the like, and at its rearward end by a receiver guide bushing 62 which extends through a slotted opening 64 in the lever 40. The receiver guide 60 includes a specially shaped guide slot 66 which is engaged by a receiver ejector pin 68 mounted on the plate 42 to extend into the slot 66.

In the operation of the receiver actuating mechanism 18 as the loading door 12 is opened (refer to FIG. 3) the initial pull in a forward direction on the loading door 12 initiates rotation of the actuator plate 42 in a clockwise direction about its pivot pin 61 by virtue of the coupling between the pin 52 at the upper right-hand corner of the actuator plate 42 and the guide slot 28 in the loading door end bracket 26. This initial rotation has no effect on the rearward support of the receiver 14 because of the play allowed by virtue of the receiver guide bushing 62 mounting within the elongated slot 64. However, it causes the receiver ejector pin 68 to exert an upward force at the forward end of the guide slot 66 of the receiver guide 60 so that the forward end of the receiver 14 is raised to break the magnetic force holding down the disc of the cartridge contained therein. Once this force is broken in this fashion, the cartridge within the receiver 14 is free to permit forward translational movement as the actuator plate 42 is rotated further by further opening of the loading door 12. During this further rotation, the rear lifter lever 40 begins to move forward and the guide pin 58 moves upward and forward in the guide slot 54, thus raising the rear end of the receiver 14 to a level substantially equal to the initially raised position of the forward end thereof, so that the receiver 14 is now in a substantially horizontal attitude, thus providing adequate height to clear the drive spindle of the drive member 20 (FIG. 1). Continuing rotation of the actuator plate 42 through the extent of its rotational travel of approximately 90° causes the lever 40 to move the receiver 14 to its fully extended forward position. While this is occurring, relative movement of the receiver ejector pin 68 rearwardly in the guide slot 66 serves to drop the forward end of the receiver 14 by virtue of the special shape of the slot 66. Such motion is permissible once the receiver 14 is in a horizontal attitude and capable of clearing the drive spindle of the member 20 (FIG. 1). Such a fully extended position of the receiver 14 is illustrated in FIG. 4. It will be noted that the construction of the members making up the receiver actuating mechanism 18 and the manner of coupling to the bracket 26 of the loading door 12 via the guide slot 28 serve to cause rotation of the actuator plate 42 through a full 90° while the loading door is rotated to its open position through only approximately 60°. It will be understood of course that, by virtue of the coupling between the actuator mechanism 18 and the loading door 12, the door 12 cannot be pivoted from its closed position and the actuating mechanism 18 cannot be operated until the latch 32 (FIG. 2) is retracted (as by the solenoid 36) to clear the pin 34. The reverse of the above described motion occurs as the loading door 12 is moved from its open to its closed position, during which the receiver 14 is retracted to a position at which a disc cartridge inserted therein may be operatively engaged by the drive spindle of the member 20 for operation by the disc drive apparatus 10.

Figure 6:
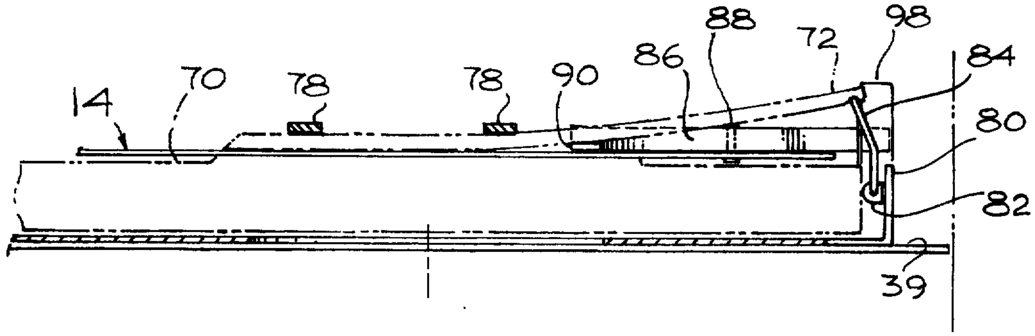
FIG. 6 is a view showing a disc cartridge located in operative position within the apparatus of FIG. 1 and illustrating the manner in which the door opening mechanisms of FIG. 5 operate to lift the head entry door of the cartridge.

As previously mentioned, the disc cartridge used in conjunction with disc drive apparatus 10 of the present invention includes a head entry door which is maintained closed when the cartridge is being transported or stored, but which must be opened to permit the entry from the disc drive apparatus 10 of the heads (not shown) which are operative with the disc within the disc cartridge. This is illustrated in FIG. 6 which shows a disc cartridge 70 mounted in operative position within disc drive apparatus 10. As shown in FIG. 6, the head entry door 72 of the disc cartridge 70 is raised to the open position. This door simply comprises a flexibly hinged portion of the housing of the disc cartridge 70, the flexible hinge feature being provided by the resilience of the molded plastic door section 72.

Figure 5:
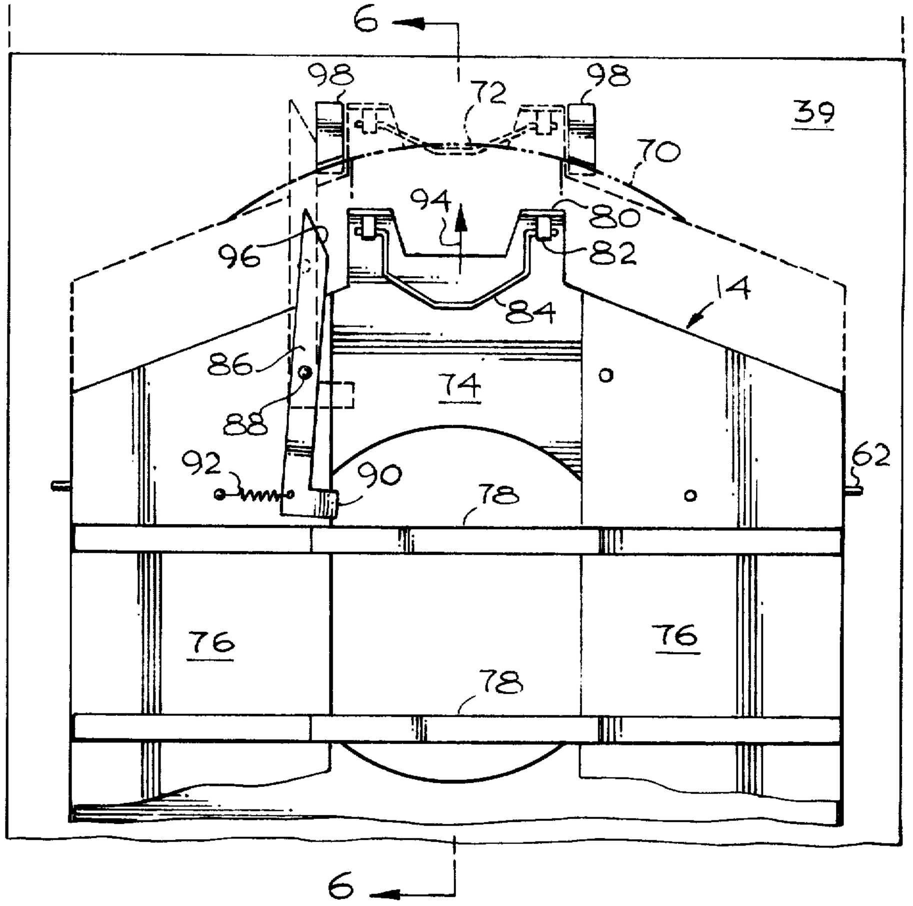
FIG. 5 is a plan view of a portion of the apparatus of FIG. 1 showing details of the head entry door opening mechanism.

FIG. 5 illustrates particular portions of the apparatus in accordance with the present invention which effectuate the opening of the head entry door 72 as the cartridge 70 is loaded into the apparatus 10. FIG. 5, a plan view of a portion of the apparatus 10, shows a receiver 14 comprising a receiver pan 74 and a pair of receiver cover members 76 extending part way across the top of the receiver 14 from the outer side edges. The cover portions 76 are held in position and the entire structure of the receiver 14 is reinforced by a pair of support struts 78 which are configured on the undersides thereof to matingly receive the upper surface of the disc cartridge 70. In this fashion, the receiver cover portion 76 and the struts 78 slidably receive the upper side of the disc cartridge 70 and rigidly maintain the cartridge 70 in proper position against the base 39 of the apparatus 10 when the receiver 14 is retracted to the operative position of the disc cartridge 70.

The receiver pan 74 is configured at the inward edge thereof to provide a pair of upstanding vertical support members 80 on which are mounted respective door opener pivot blocks 82. These pivot blocks 82 support between them in pivoting relationship a door opener pivot member in the form of a wire bail 84. This bail is operative to engage the forward end of the head entry door 72 as the disc cartridge 70 is inserted within the receiver 14 preparatory to loading the cartridge within the disc drive apparatus 10 and, after it engages the forward end of the head entry door 72, further rearward movement of the cartridge 70 to the home position within the receiver 14 causes the bail 84 to rotate slightly about its pivot axis through the blocks 82, thus raising and opening the forward end of the head entry door 72 to the maximum height available within the limited head space of the apparatus 10. The bail 84 is shown in FIG. 1 in the vertical position which it assumes when a cartridge is loaded within the receiver 14 to open the head entry door. However, since the head entry door hinge is of a somewhat flexible material (usually molded plastic) there is a sag along its extent which sometimes fails to clear the internal hub mechanism as required. Accordingly, door opener levers 86 are provided to complete the raising of the head entry door 72, particularly to eliminate the sag along the door hinge, during loading of the cartridge 70 within the apparatus 10 by retraction of the receiver 14 as the loading door 12 is closed. These levers 86 are mounted for rotation about a pivot member 88 affixed to the receiver cover 76. At the outer end of the lever 86 there is provided a right angled portion 90 which is wedge-shaped so as to slip under the adjacent portion of the head entry door 72 and lift it the additional amount required to provide the clearance for the read/write heads within the cartridge 70. The door opener levers 86 are maintained in the position shown by the solid line representation of FIG. 5 by springs 92 however, as the receiver 74 is moved inwardly, as indicated by the arrow 94 in FIG. 5, to the position represented by the broken line outline, the inward end of the lever 86, having an angled surface 96, engages a fixed pillar 98 extending upwardly from the base 39 of the apparatus 10. This causes the levers 86 to rotate about the pivot mounting 88 against the springs 92, driving the wedge-shaped portion 90 inward and under the adjacent portions of the head entry door 72, thus lifting them a little further than they had been raised by the bail 84 and providing the required clearance for the heads which are now extended into the disc 70 for operation in conventional fashion with the disc drive apparatus 10. When the cartridge 70 is to be removed from the disc drive apparatus 10, the receiver 14 is moved forward in the manner already described and as the inner ends 96 of the door opener levers 86 clear the pillars 98, the levers 86 rotate to their retracted positions under the force of the springs 92 so that the wedge-shaped portions 90 clear the door 72. Thereafter, as the cartridge 70 is withdrawn from the receiver 14, the bail 84 pivots outward and permits the door 72 to close completely.

Although there have been described hereinabove specific arrangements of a front loading disc drive apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. In disc drive apparatus adapted for receiving a standard disc cartridge through a front loading door, the combination comprising:

a frame;

a receiver for accepting and retaining the disc cartridge in a generally horizontal attitude at a first level relative to the frame, the receiver being mounted on the frame for movement between respective extended and retracted positions generally parallel to each other;

a base upon which the disc cartridge is to be mounted for operation within the apparatus at a second level lower than said first level, said base being connected to the frame and including an upwardly extending drive spindle upon which the disc cartridge is to be centrally engaged;

a front panel loading door pivotably joined to the frame for rotation about a pivot axis located near the lower forward edge of the door; and actuating means coupled between the frame, the door, and the receiver for moving the receiver in two orthogonal directions between the extended position at the first level and the retracted position at the second level in response to movement between respective open and closed positions of the loading door.

2. Apparatus in accordance with claim 1 further including releasable means for latching the actuating means to prevent the opening of the door and movement of the receiver.

3. Apparatus in accordance with claim 2 wherein the latching means includes a latch member and a solenoid which, when energized, retracts the latch member to release the latching means.

4. Apparatus in accordance with claim 1 wherein the actuating means comprises:

a first guide member mounted on said base;

a second guide member mounted on the receiver;

a third guide member mounted on the door; and means linking said first, second and third guide members to produce an initial lifting of the receiver away from said base following by translational forward movement of the receiver relative to the base as the loading door is moved from the closed to the open position.

5. Apparatus in accordance with claim 4 wherein said second guide member is affixed to the forward portion of the receiver and wherein said linking means includes means coupled to the second guide member for lifting the forward portion of the receiver prior to any other motion thereof as the loading door is opened.

6. Apparatus in accordance with claim 5 including an actuator member pivotably mounted to the base adjacent its lower forward corner and an elongated linkage member coupled between the lower rearward corner of the actuator member and the first guide member for engagement therewith.

7. Apparatus in accordance with claim 6 including means coupling the actuator member to the second guide member, said means being located along the lower edge of said actuator member substantially on a line between the pivot axis of the actuator member and the pivot axis of the coupling between the actuator member and the linkage member.

8. Apparatus in accordance with claim 6 further including means coupling the upper forward portion of the actuator member to the loading door.

9. Apparatus in accordance with claim 8 wherein the actuator member includes a forwardly extending portion at its upper forward corner, said means for coupling the actuator member to the loading door being mounted at said forwardly extending portion.

10. Apparatus in accordance with claim 8 wherein said loading door comprises a pair of end plates at opposite sides of the door, each end plate having a configured guide slot therein engaging said coupling means.

11. Apparatus in accordance with claim 8 wherein said coupling means comprises means for rotating the actuating member through approximately 90° about its pivot axis as the loading door is rotated through approximately 60° about its pivot axis.

12. Apparatus in accordance with claim 10 wherein one set of said actuating means is provided on each side of the apparatus for coupling with the respective end plates of the loading door.

13. Apparatus in accordance with claim 12 wherein the means coupling the linkage member to the actuating member includes an extension for latching the actuating means with the receiver in the retracted position so as to prevent the loading door from being opened.

14. Apparatus in accordance with claim 1 further including first and second means for opening a head entry door in said cartridge as the cartridge is loaded into the apparatus.

15. Apparatus in accordance with claim 14 wherein the first means includes pivotable means for opening the head entry door by engaging and lifting the outer end thereof and the second means includes means for engaging and lifting an inner portion of the head entry door as the receiver is moved to said retracted position.

16. Apparatus in accordance with claim 15 wherein said second means comprises a pair of levers pivotably mounted on opposite sides of the receiver, each including a wedge-shaped portion for projecting under and lifting adjacent portions of the head entry door of a cartridge placed within the receiver.

17. Apparatus in accordance with claim 16 further including a pair of fixed pillars attached to the base and wherein the second means comprises a bevelled surface along each of the levers remote from the wedge-shaped portion for engaging respective ones of said pillars and moving the wedge-shaped portions of the levers into operative position.

18. Apparatus in accordance with claim 17 further including biasing springs attached between the receiver and the levers for withdrawing the wedge-shaped portions from engagement with the head entry door as the receiver is moved from its retracted position.

* * * * *